(12) United States Patent
Cannon et al.

(10) Patent No.: US 7,773,314 B2
(45) Date of Patent: Aug. 10, 2010

(54) LASER DIODE/PRE-SCAN ASSEMBLY

(75) Inventors: Roger Steven Cannon, Nicholasville, KY (US); Kevin Maichle Hargrave, Lexington, KY (US); Philip Jerome Heink, Lexington, KY (US); Danny Wayne Peters, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 342 days.

(21) Appl. No.: 11/858,435

(22) Filed: Sep. 20, 2007

(65) Prior Publication Data
US 2009/0080091 A1 Mar. 26, 2009

(51) Int. Cl.
*G02B 17/00* (2006.01)
(52) U.S. Cl. .................... 359/726; 359/204.1
(58) Field of Classification Search ............... 359/726, 359/204.1, 201.1, 204.4
See application file for complete search history.

(56) References Cited

U.S. PATENT DOCUMENTS

| | | | |
|---|---|---|---|
| 5,068,528 A * | 11/1991 | Miller et al. | 250/231.13 |
| 5,157,535 A | 10/1992 | Heink et al. | |
| 7,152,798 B2 | 12/2006 | Cannon et al. | |
| 7,184,103 B2 * | 2/2007 | Lee et al. | 348/744 |
| 7,359,052 B2 * | 4/2008 | Fielden et al. | 356/369 |
| 7,554,568 B2 * | 6/2009 | Kuribayashi | 347/256 |
| 2002/0064192 A1 * | 5/2002 | Missey et al. | 372/20 |
| 2005/0211781 A1 | 9/2005 | Cannon et al. | |
| 2007/0131882 A1 * | 6/2007 | Richman | 250/573 |
| 2007/0253049 A1 * | 11/2007 | Tomita | 359/204 |

\* cited by examiner

*Primary Examiner*—Timothy J Thompson

(57) ABSTRACT

A laser diode/pre-scan assembly associated with a printhead for a laser printer is presented. The laser diode/pre-scan assembly includes a pair of collimation lenses that are de-centered from the axes of a pair of laser beams to direct the pair of beams inwardly in a process direction and into a single pre-scan lens. A corresponding method of constructing a laser diode/pre-scan assembly for a laser printer is also presented.

18 Claims, 3 Drawing Sheets

LASER DIODE/PRE-SCAN ASSEMBLY

FIELD OF THE INVENTION

The present invention relates generally to a laser diode/pre-scan assembly for use in a laser printer and, more particularly, to a method of converging and directing a laser beam by de-centering a collimation lens relative to the laser beam center axis in a laser diode/pre-scan assembly.

BACKGROUND OF THE INVENTION

Laser printers typically include a printhead for generating a scanning laser beam to selectively charge an image that is to be printed onto a surface of a photosensitive drum from which the image will subsequently be transferred to a medium that is to be printed. Typically, the printhead will comprise a laser/diode pre-scan assembly for generating a laser beam, a scanner assembly to sweep the beam in a scan direction and a post-scan assembly to focus the beam and direct it onto the surface of the photosensitive drum at a proper position.

A printhead for a modern color laser printer may include four separate laser diodes to generate four separate laser beams corresponding, for example, to the colors yellow, cyan, magenta and black. In the pre-scan optical assembly, the individual beams are collimated and directed onto facets of a single rotating polygonal mirror in the scanning assembly. The facets of the rotating mirror sweep the individual beams across the surfaces of a plurality of mirrors and through f-theta lenses within the post-scan assembly. The beams then scan across surfaces of four corresponding photosensitive drums within the printer.

Referring now to FIG. 1, a conventional laser diode/pre-scan optical arrangement for use in a laser printer is shown diagrammatically and referred to generally by reference numeral 100. The conventional arrangement 100 includes a first laser diode 110 emitting a first laser beam 112, having a first beam center axis 114.

The first laser beam 112 diverges in both a process direction P and in a scan direction S upon leaving the first laser diode 110. In FIG. 1, the scan direction S is a direction in and out of the plane of the paper and is indicated by a point S. In the illustrated conventional arrangement 100, the first laser beam 112 diverges in the process direction P at an angle of about 8 degrees and in the scan direction S at an angle within a range of about 25 degrees to about 35 degrees.

A first structure 116, defining a first aperture 118, is positioned in the path of the first laser beam 112 such that a center portion 120 of the first laser beam 112 passes through the first aperture 118 and a peripheral portion of the first laser beam 112 represented by rays 122 and 124 is blocked by the first structure 116. The first aperture 118 is generally oval in shape.

After passing through the first aperture 118, the center portion 120 of the first laser beam 112 strikes a first surface 126 of a first collimation lens 128.

The first collimation lens 128 has optical power in the process direction P and in the scan direction S. The first collimation lens 128 further has an optical axis 130 passing through a mechanical center 132 of the first collimation lens 128. In the conventional arrangement 100 illustrated in FIG. 1, the first collimation lens 128 is positioned such that the optical axis 130 is substantially coaxial with the first beam center axis 114.

The first collimation lens 128 has a focal length in the focus direction F defined as a distance between the mechanical center 132 of the lens 128 and a point (not shown) where light rays that are parallel with the lens 128 optical axis 130 will converge to a point after passing through lens 128. In the conventional arrangement illustrated in FIG. 1, the first collimation lens 128 is positioned relative to the first laser diode 110 in the focus direction F such that a distance $F_1$ between the point where the first laser beam 112 is emitted from the first laser diode 110 and the mechanical center 132 of the first collimation lens 128 is substantially equal to the focal length of the first collimation lens 128. In this fashion, the rays of the generally diverging first laser beam 112 emitted from the first laser diode 110 are collimated by the first collimation lens 128 such that a substantially collimated first laser beam 134 comprising substantially parallel rays 136, 138 and 140 is created as the first laser beam 114 passes through the first collimation lens 128.

The substantially collimated first laser beam 134 now strikes a pre-scan lens 142. The pre-scan lens 142 is a cylindrical lens having optical power in the process direction P only. The pre-scan lens 142 causes the rays 136, 138 and 140 of the substantially collimated first laser beam 134 to bend inward in the process direction P and further causes the rays 136, 138 and 140 to converge in the process direction P such that a converging first laser beam 144 comprising rays 146, 148 and 150 is created. The beam 144 is directed toward and converges to a point 152 in the process direction on a surface 154 of a scanner mirror, shown only partially in FIG. 1.

The conventional arrangement 100 also includes a second laser diode 158 emitting a second laser beam 160, having a second beam center axis 162. In the conventional arrangement 100 illustrated, the second laser diode 158 is separated from the first laser diode 110 in the process direction P such that the second beam center axis 162 is separated from the first beam center axis 114 by a distance $P_1$ in the process direction P.

The second laser beam 160 diverges in both the process direction P and in the scan direction S upon leaving the second laser diode 160. The second laser beam 160 diverges in the process direction P at an angle of about 8 degrees and in the scan direction S at an angle within a range of about 25 degrees to about 35 degrees.

A second structure 164 defining a second aperture 166 is positioned in the path of the second laser beam 160 such that a center portion 168 of the second laser beam 160 passes through the second aperture 166 and a peripheral portion of the second laser beam 160 represented by rays 170 and 174 is blocked by the second structure 164. The second aperture 166 is generally oval in shape.

After passing through the second aperture 166, the center portion 168 of the second laser beam 160 strikes a first surface 176 of a second collimation lens 178. In the illustrated conventional arrangement 100, the structure 164, defining the aperture 166, is positioned about 1 mm in the focus direction F from the first surface 176 of the second collimation lens 178.

The second collimation lens 178 has optical power in the process direction P and in the scan direction S. The second collimation lens 178 further has an optical axis 180 passing through a mechanical center 182 of the second collimation lens 178. In the conventional optical arrangement illustrated in FIG. 1, the second collimation lens 178 is positioned such that the optical axis 182 is substantially coaxial with the second beam center axis 162.

The second collimation lens 178 has a focal length in the focus direction F defined as a distance between the mechanical center 182 of the lens 178 and a point (not shown) where light rays that are parallel with the optical axis 180 of the lens 178 will converge to a point after passing through the lens 178. In the conventional arrangement 100 illustrated in FIG.

1, the second collimation lens 178 is positioned relative to the second laser diode 158 in a focus direction F such that a distance $F_1$ between the point where the second laser beam 160 is emitted from the second laser diode 158 and the mechanical center 182 of the second collimation lens 178 is substantially equal to the focal length of the second collimation lens 178. In this fashion, the rays of the generally diverging second laser beam 160 emitted from the second laser diode 158 are collimated by the second collimation lens 178 such that a substantially collimated second laser beam 184 comprising substantially parallel rays 186, 188 and 190 is created as the second laser beam 160 passes through the second collimation lens 178.

The substantially collimated second laser beam 184 now strikes the pre-scan lens 142. The pre-scan lens 142 is a cylindrical lens having optical power in the process direction P only. The pre-scan lens 142 causes the rays 186, 188 and 190 of the substantially collimated second laser beam 184 to bend inward in the process direction P and further causes the rays 186, 188 and 190 to converge in the process direction P such that a converging second laser beam 192 comprising rays 194, 196 and 198 is created. The second beam 192 is directed toward and converges to a point in the process direction that is near or at the same point 152 on the surface 154 of the scanner mirror 156 where the converging first laser beam 144 strikes the surface 154 of the scanner mirror 156.

In the conventional optical arrangement illustrated, the distance $P_1$ in the process direction between the first beam center axis 114 and the second beam center axis 162 is substantially equal to a distance $P_2$ between the optical axis 130 of the first collimation lens 128 and the optical axis 180 of the second collimation lens 178. Additionally, as previously mentioned, the first and second beam center axes 114 and 162 of the first and second laser beams 112 and 160 are substantially coaxial with the first and second optical axes 130 and 180, respectively, of the first and second collimation lenses 128 and 178. As a result, the first and second collimation lenses 128 and 182 serve to collimate the first and second laser beams 112 and 160, respectively, creating the substantially collimated laser beams 134 and 184.

SUMMARY OF THE INVENTION

In accordance with a first aspect of the present invention, a laser pre-scan assembly for use in a laser printer is provided. The pre-scan assembly may comprise a first laser diode for emitting a first laser beam having a first beam center axis and a second laser diode for emitting a second laser beam having a second beam center axis. The first beam center axis and the second beam center axis may be separated from one another by a first distance in the process direction. The pre-scan assembly may further comprise a first collimation assembly comprising a first collimation lens having a first optical axis and causing the first laser beam to converge in a scan direction and in the process direction, and a second collimation assembly comprising a second collimation lens having a second optical axis and causing the second laser beam to converge in the scan direction and in the process direction. The first optical axis may be separated from the second optical axis by a second distance in the process direction. The pre-scan assembly may further comprise a pre-scan lens configured to further converge the first laser beam and the second laser beam in the process direction and direct the first and second laser beams onto or near a common point on a surface of a scanner mirror. The first collimation lens and the second collimation lens may be positioned relative to the first laser diode and the second laser diode such that the first distance is greater that the second distance so that the first collimation lens directs the first laser beam inwardly in the process direction toward the pre-scan lens and the second collimation lens directs the second laser beam inwardly in the process direction toward the pre-scan lens.

The first collimation lens may direct the first laser beam inwardly in the process direction toward the pre-scan lens an amount within a range of from about 0.25 degree to about 1 degree and the second collimation lens may direct the second laser beam inwardly toward the pre-scan lens an amount within a range of from about 0.25 degree to about 1 degree.

The first collimation assembly may further comprise a first structure defining a first aperture for receiving the first laser beam. The first structure may be configured to block a portion of the first laser beam passing therethrough. The second collimation assembly may further comprise a second structure defining a second aperture for receiving the second laser beam. The second structure may be configured to block a portion of the second laser beam passing therethrough.

The first structure defining the first aperture may have a first dimension in the scan direction and a second smaller dimension in the process direction, and the second structure defining the second aperture may have a first dimension in the scan direction and a second smaller dimension in the process direction.

A distance in a focus direction between the first laser diode and the first collimation lens may be greater than a distance defined by a focal length of the first collimation lens, and a distance in the focus direction between the second laser diode and the second collimation lens may be greater than a distance defined by a focal length of the second collimation lens.

The first laser beam may converge or nearly converge in the process direction to a first point on the surface of the scanner mirror and the second laser beam may converge or nearly converge in the process direction to a second point on the surface of the scanner mirror and the first point may be near or the same point as the second point.

The distance between where the first laser beam and the second laser beam strike the surface of the scanner mirror may be within a range of from about 0 microns to about 200 microns.

The first collimation lens may comprise a double convex spherical lens and the second collimation lens may comprise a double convex spherical lens.

The pre-scan lens may comprise a cylindrical lens having power in the process direction.

In accordance with a second aspect of the present invention, a laser pre-scan assembly for use in a laser printer is provided. The laser pre-scan assembly may comprise: a laser diode for emitting a laser beam and a collimation assembly comprising a collimation lens having a centered optical axis. The collimation lens may be positioned relative to the laser diode such that the laser beam enters the collimation lens a spaced distance away from the optical axis so that the collimation lens directs the laser beam inwardly in a process direction.

The spaced distance may be from about 100 microns to about 400 microns.

The collimation lens may be positioned relative to the laser diode such that the collimation lens converges the laser beam in a scan direction and in the process direction.

The pre-scan assembly may further comprise a pre-scan lens configured to further converge the laser beam in the process direction and direct the laser beam onto a point on a surface of a scanner mirror.

The collimation assembly may further comprise a structure defining an aperture for receiving the laser beam. The structure may be configured to block a portion of the laser beam passing therethrough.

The structure defining the aperture may have a first dimension in the scan direction and a second smaller dimension in the process direction.

A distance in a focus direction between the laser diode and the collimation lens may be greater than a distance defined by a focal length of the collimation lens.

The laser beam may converge or nearly converge in the process direction to a point on the surface of the scanner mirror.

In accordance with a third aspect of the present invention a method of constructing a laser pre-scan assembly is presented. The method may comprise providing a first laser diode for emitting a first laser beam having a first beam center axis and as second laser diode for emitting a second laser beam having a second beam center axis. The first beam center axis the second beam center axis may be separated from one another by a first distance in a process direction. The method may yet comprise providing a first collimation assembly comprising a first collimation lens having a first optical axis and causing the first laser beam to converge in a scan direction and in the process direction. The method may yet further comprise providing a second collimation assembly comprising a second collimation lens having a second optical axis and causing said second laser beam to converge in the scan direction and in the process direction. The first optical axis may be separated from the second optical axis by a second distance in the process direction. The method further comprise providing a pre-scan lens configured to further converge the first laser beam and the second laser beam in the process direction and direct the first laser beam and the second laser beam onto or near a common point on a surface of a scanner mirror. The first collimation lens and the second collimation lens may be positioned relative to the first laser diode and the second laser diode such that the first distance is greater than the second distance so that the first collimation lens directs the first laser beam inwardly in the process direction toward the pre-scan lens and the second collimation lens directs the second laser beam inwardly in the process direction toward the pre-scan lens.

The first collimation lens may direct the first laser beam inwardly in the process direction toward the pre-scan lens an amount within a range of from about 0.25 degree to about 1 degree and the second collimation lens may direct the second laser beam inwardly in the process direction toward the pre-scan lens an amount within a range of from about 0.25 degree to about 1 degree.

Providing a first collimation assembly may further comprise providing a first structure defining an aperture for receiving the first laser beam. The first structure may be configured to block a portion of the first laser beam passing therethrough.

Providing a second collimation assembly may further comprise providing a second structure defining an aperture for receiving the second laser beam. The second structure may be configured to block a portion of the second laser beam passing therethrough.

BRIEF DESCRIPTION OF THE DRAWINGS

The following detailed description of the preferred embodiments of the present invention can best be understood when read in conjunction with the following drawings, where like structure is indicated with like reference numerals, and in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Optical systems used in laser printers may be characterized as having three sub-systems or assemblies, namely, a laser diode/pre-scan optical assembly, a scanning assembly, and a post-scan assembly. The scanning assembly may comprise a single rotating polygonal mirror to sweep four separate laser beams generated by four separate laser diodes in a scan direction across the surfaces of a plurality of mirrors, through lenses defining an F-theta lens system and onto the surfaces of four separate photosensitive drums. As noted above, a pair of beams striking a scanner mirror in a conventional device are focused or converged in a process direction only. However, it is believed that advantages such as improved and/or less costly post-scan assembly F-theta lens systems can be employed in color laser printers if each of one or more pairs of beams is focused at least some amount in the scan direction as well as to a point in the process direction when the beam strikes the rotating polygonal mirror. It is also desirable that each beam be directed or diverted to strike the scanner mirror at or near a point where its corresponding beam forming part of the pair of beams strikes the mirror.

Figure 2:
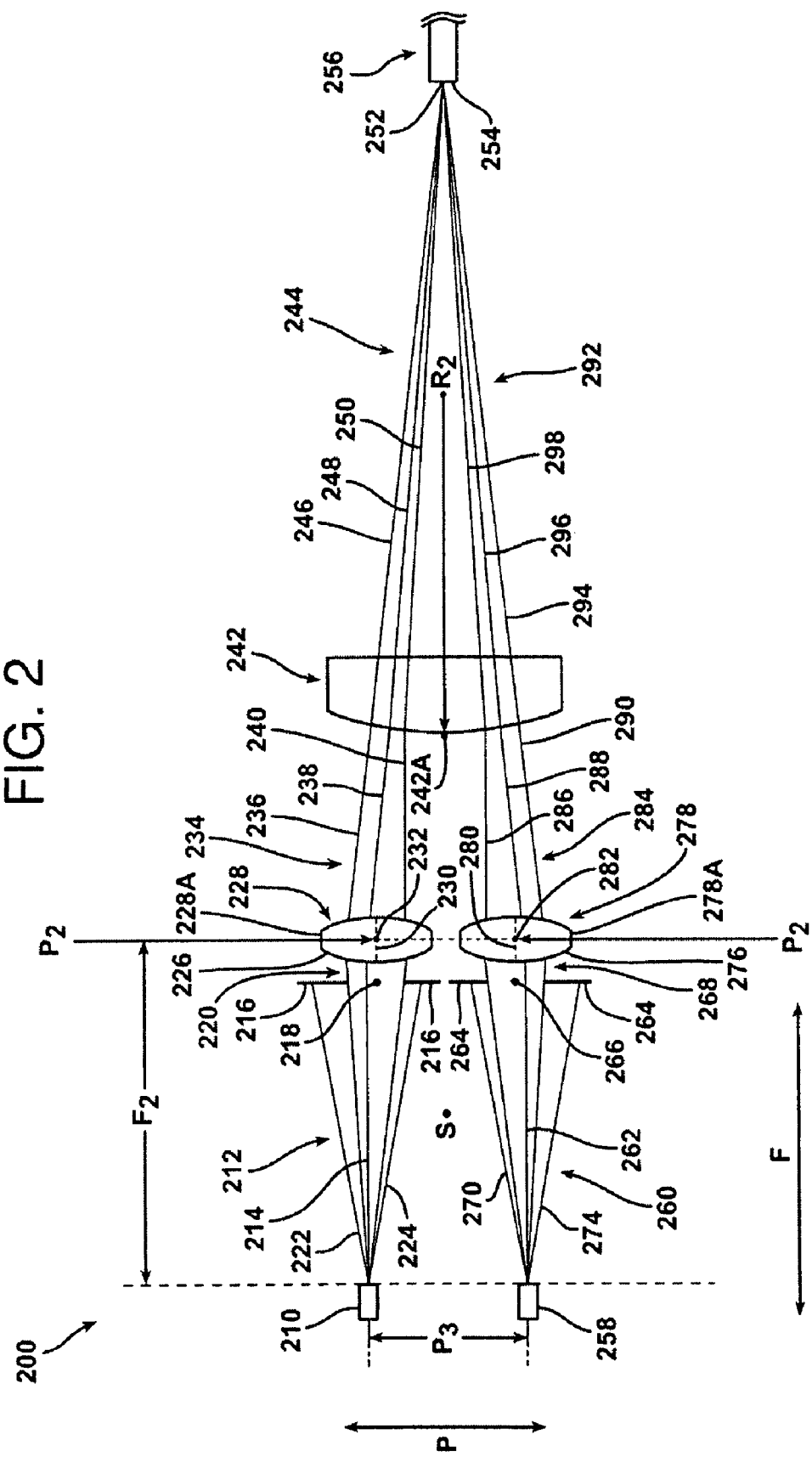
FIG. 2 is a diagrammatic representation of a laser diode/pre-scan assembly of a first embodiment of the present invention illustrating collimation lenses de-centered from the laser beam center axes by repositioning the laser diodes and showing converging laser beams entering the pre-scan lens.

Referring now to FIG. 2, a laser diode/pre-scan assembly for use in a laser printer in accordance with a first embodiment of the present invention is shown diagrammatically, referred to generally by reference numeral 200. The illustrated laser diode/pre-scan assembly 200 includes a first laser diode 210 emitting a first laser beam 212, having a first beam center axis 214. The first laser beam 212 diverges in both the process direction P and in the scan direction S upon leaving the first laser diode 210. In FIG. 2, the scan direction S is a direction in and out of the plane of the paper and is indicated by a point S.

In the illustrated embodiment, the first laser beam 212 diverges in the process direction P at an angle of about 8 degrees and in the scan direction S at an angle within a range of about 25 degrees to about 35 degrees. A first structure 216, defining a first aperture 218, is positioned in the path of the first laser beam 212 such that an inner portion 220 of the first laser beam 212 passes through the first aperture 218 and a peripheral portion of the first laser beam 212, represented by rays 222 and 224, is blocked by the first structure 216. In the illustrated embodiment, the first aperture 218 is generally oval in shape and has a maximum dimension in the process direction P within a range of about 2 mm to about 3 mm and a larger maximum dimension in the scan direction S within a range of about 4 mm to about 5 mm.

After passing through the first aperture 218, the inner portion 220 of the first laser beam 212 strikes a first surface 226 of a first collimation lens 228. In the illustrated first embodiment assembly 200, the first structure 216, defining the first aperture 218, is positioned about 1 mm in a focus direction F from the first surface 226 of the first collimation lens 228.

The first collimation lens 228 is a double convex spherical glass collimation lens having optical power in the process direction P and in the scan direction S. The first collimation lens 228 further has an optical axis 230 passing through a mechanical center 232 of the first collimation lens 228. In the first embodiment assembly 200 illustrated, the first beam center axis 214 is not coaxial with the optical axis 230 of the first collimation lens 228 as will be discussed more thoroughly herein.

The first collimation lens 228 has a focal length in the focus direction F defined as a distance between the mechanical center 232 of the lens 228 and a point (not shown) where light rays that are parallel with the lens optical axis 230 will converge to a point after passing through the lens 228. In the first embodiment assembly 200 illustrated in FIG. 2, the first collimation lens 228 is positioned relative to the first laser diode 210 in the focus direction F such that a distance $F_2$ between the point where the first laser beam 212 is emitted from the first laser diode 210 and the mechanical center 232 of the first collimation lens 228 is greater than the focal length of the first collimation lens 228. As a result, the rays of the generally diverging first laser beam 214 passing through the first collimation lens 228 are caused to converge a first amount in the process direction P and a first amount in the scan direction S, wherein the first amount in the process direction P may be slightly different from the first amount in the scan direction S. Thus, the beam 234 emerging from the first collimation lens 238 is converging in the process direction P and in the scan direction S.

Figure 1:
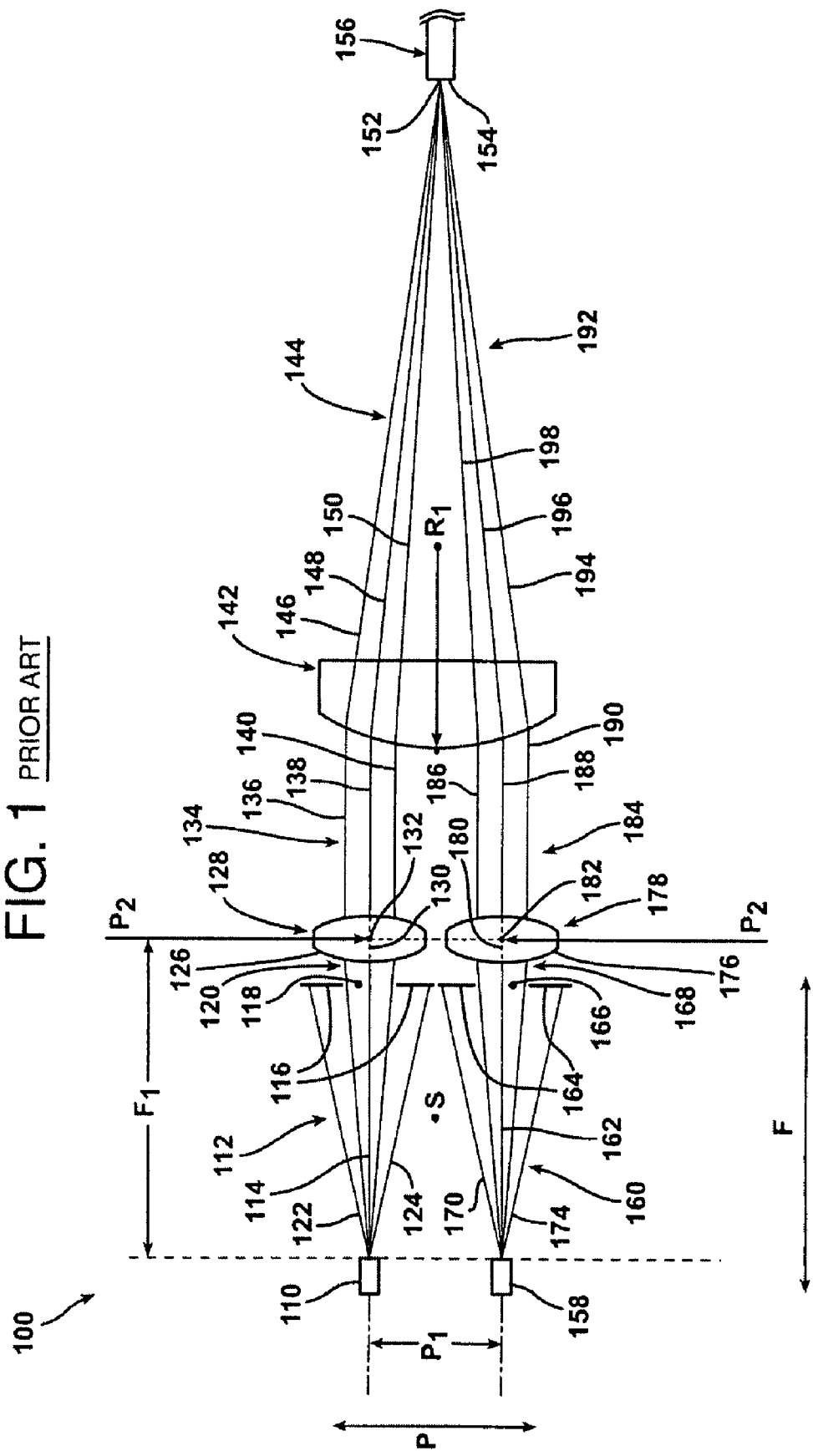
FIG. 1 is a diagrammatic representation of a conventional laser diode/pre-scan assembly illustrating collimation lenses on center with the laser beam center axes and showing substantially collimated laser beams entering the pre-scan lens.

The distance $F_2$ is greater than the distance $F_1$, see FIG. 1, between the point where the first laser beam 112 is emitted from the first laser diode 110 and the mechanical center 130 of the first collimation lens 128 in the conventional arrangement 100, see FIG. 1.

Referring again to FIG. 2, in addition to being focused or converged in the process and scan directions by the lens 228, the first laser beam 212 upon passing through the first collimation lens 228 is also caused to deflect inward a first amount in the process direction P toward a pre-scan lens 242 as will be discussed more thoroughly herein.

The pre-scan lens 242 is a cylindrical lens having optical power in the process direction P only. The pre-scan lens 242 causes the rays 236, 238 and 240 of the converging first laser beam 234 to bend inward in the process direction P a second amount and further causes the rays 236, 238 and 240 to converge in the process direction P a second amount such that a converging first laser beam 244 comprising rays 246, 248 and 250 is created.

The pre scan lens 242 has a radius $R_2$ defining a focal length in the focus direction F such that the converging first laser beam 244 is directed to a point 252 on a surface 254 of a scanner mirror 256, shown only partially in FIG. 2. The pre-scan lens 242 also causes the rays 246, 248 and 250 to converge in the process direction P a second amount such that the rays 246, 248 and 250 will converge or nearly converge in the process direction to the same point 252 on the surface 254 of the scanner mirror 256.

The angle of convergence in the scan direction downstream from the first collimation lens 228 may be from about 0.2 degree to about 0.5 degree. It is also noted that for an aperture 218 having a size of about 4.3 mm in the scan direction, the beam size at the surface 254 of the scanner mirror 256 in the scan direction may be about 3.4 mm.

Referring now to FIGS. 1 and 2, the radius $R_2$ of the pre-scan lens 242 is greater than a radius $R_1$ of the pre-scan lens 142 in the conventional arrangement 100. As a result, the pre-scan lens 242 of the first embodiment assembly 200 has less power in the process direction P than does the pre-scan lens 142 of the conventional arrangement 100. Thus, the pre-scan lens 242 causes the first laser beam 234 to bend inward in the process direction P a second amount that is smaller than the amount that the pre-scan lens 142 of the conventional arrangement 100 causes the first laser beam 134 to bend inward in the process direction P.

The pre-scan lens 242 of the first embodiment assembly 200 also causes the first laser beam 234 to converge in the process direction P a second amount that is smaller than the amount that the pre-scan lens 142 of the conventional arrangement 100 causes the first laser beam 134 to converge in the process direction P. Because the first laser beam 234 is converging in the process direction a first amount after passing through the first collimation lens 228, the pre-scan lens 242 need further converge the first laser beam 234 in the process direction a second amount that is smaller than the amount that the pre-scan lens 142 of the conventional arrangement 100 converges the first laser beam 134 in order for the beam to converge or nearly converge in the process direction to the point 252 on the surface 254 of the scanner mirror 256 as desired.

The first embodiment assembly 200 also includes a second laser diode 258, emitting a second laser beam 260, having a second beam center axis 262. In the first embodiment illustrated, the second laser diode 258 is separated from the first laser diode 210 in the process direction P such that the second beam center axis 262 is separated from the first beam center axis 214 by a distance $P_3$ in the process direction P. The distance $P_3$ is greater than the distance $P_1$ that separates the first beam center axis 114 from the second beam center axis 162 in the conventional arrangement 100, see FIG. 1.

The second laser beam 260 diverges in both the process direction P and in the scan direction S upon leaving the second laser diode 258. The second laser beam 262 diverges in the process direction P at an angle of about 8 degrees and in the scan direction S at an angle within a range of about 25 degrees to about 35 degrees.

A second structure 264, defining a second aperture 266, is positioned in the path of the second laser beam 260 such that an inner portion 268 of the second laser beam 260 passes through the second aperture 266 and a peripheral portion of the second laser beam 260, represented by rays 270 and 274, is blocked by the second structure 264. The second aperture 266 in the first embodiment assembly 200 is generally oval in shape and has a maximum dimension in the process direction P within a range of about 2 mm to about 3 mm and a larger maximum dimension in the scan direction S within a range of about 4 mm to about 5 mm. A center point of the second aperture 266 is spaced a distance $P_2$ from a center point of the first aperture 218.

After passing through the second aperture 266, the inner portion 268 of the second laser beam 260 strikes a first surface 276 of a second collimation lens 278. In the illustrated first embodiment assembly 200, the second structure 264, defining the second aperture 268, is positioned about 1 mm in the focus direction F from the first surface 276 of the second collimation lens 278.

The second collimation lens 278 is a double convex spherical glass collimation lens having optical power in the process direction P and in the scan direction S. The second collimation lens 278 further has an optical axis 280 passing through a mechanical center 282 of the second collimation lens 278. In the first embodiment assembly 200 illustrated, the second beam center axis 262 is not coaxial with the optical axis 280 of the second collimation lens 278 as will be discussed more thoroughly herein.

The second collimation lens 278 has a focal length in the focus direction F defined as a distance between the mechanical center 282 of the lens 278 and a point (not shown) where light rays that are parallel with the lens 278 optical axis 280 will converge to a point after passing through the lens 278. In the first embodiment assembly 200 illustrated in FIG. 2, the second collimation lens 278 is positioned relative to the second laser diode 258 in the focus direction F such that a distance $F_2$ between the point where the second laser beam 260 is emitted from the second laser diode 258 and the mechanical center 282 of the second collimation lens 278 is greater than the focal length of the second collimation lens 278. As a result, the rays of the generally diverging second laser beam 260 passing through the second collimation lens 278 are caused to converge a first amount in the process direction P and a first amount in the scan direction S, wherein the first amount in the process direction P may be slightly different from the first amount in the scan direction S. Thus, the beam 284 emerging from the second collimation lens 278 is converging in the process direction P and in the scan direction S. The distance $F_2$ is greater than the distance $F_1$, see FIG. 1, between the point where the second laser beam 160 is emitted from the second laser diode 158 and the mechanical center 182 of the second collimation lens 178 in the conventional arrangement 100, see FIG. 1.

Referring again to FIG. 2, in addition to being focused or converged in the process and scan directions by the lens 278, the second laser beam 260 upon passing through the second collimation lens 278 is also caused to deflect inward a first amount in the process direction P toward the pre-scan lens 242 as will be discussed more thoroughly herein.

As previously mentioned, the pre-scan lens 242 is a cylindrical lens having optical power in the process direction P only. The pre-scan lens 242 causes the rays 286, 288 and 290 of the converging second laser beam 284 to bend inward in the process direction P a second amount and further causes the rays 286, 288 and 290 to converge in the process direction P a second amount such that a converging second laser beam 292 comprising rays 294, 296 and 298 is created.

As noted above, the pre scan lens 242 has a radius $R_2$ defining a focal length in the focus direction F such that the converging second laser beam 292 is directed to a point in the process direction that is near or the same point 252 on the surface 254 of the scanner mirror 256 where the converging first laser beam 244 strikes the surface 254 of the scanner mirror 256. In the first embodiment assembly 200 illustrated in FIG. 2, the converging second laser beam 292 strikes the surface 254 of the scanner mirror 256 at a point that is within a range of from about 0 microns to about 200 microns of the point 252 where the converging first laser beam 244 strikes the surface 254 of the scanner mirror 256. The pre-scan lens 242 also causes the rays 294 296 and 298 to converge in the process direction P a second amount such that the rays 294, 296 and 298 will converge or nearly converge in the process direction to the same point 252 on the surface 254 of the scanner mirror 256.

Referring now to FIGS. 1 and 2, as noted above, the radius $R_2$ of the pre-scan lens 242 is greater than the radius $R_1$ of the pre-scan lens 142 in the conventional arrangement 100. As a result, the pre-scan lens 242 of the first embodiment assembly 200 has less power in the process direction P than does the pre-scan lens 142 of the conventional arrangement 100. Thus, the pre-scan lens 242 causes the second laser beam 284 to bend inward in the process direction P a second amount that is smaller than the amount that the pre-scan lens 142 of the conventional arrangement 100 causes the second laser beam 184 to bend inward in the process direction P.

The pre-scan lens 242 of the first embodiment assembly 200 also causes the second laser beam 284 to converge in the process direction P a second amount that is smaller than the amount that the pre-scan lens 142 of the conventional arrangement 100 causes the second laser beam 184 to converge in the process direction P. Because the second laser beam 284 is converging a first amount in the process direction after passing through the second collimation lens 278, the pre-scan lens 242 need further converge the second laser beam 284 a second amount in the process direction that is smaller than the amount that the pre-scan lens 142 of the conventional arrangement 100 converges the second laser beam 184 in order for the beam to converge or nearly converge in the process direction to the point 252 on the surface 254 of the scanner mirror 256 as desired.

In the illustrated first embodiment assembly 200, the distance $P_3$ in the process direction P between the first beam center axis 214 and the second beam center axis 262 is greater than the distance $P_1$ in the process direction P between the first beam center axis 114 and the second beam center axis 162 of the conventional arrangement 100, see FIG. 1. This may be accomplished by spacing the first laser diode 210 and the second laser diode 258 apart an equal amount in the process direction P relative to the positions of the first laser diode 110 and the second laser diode 158 in the conventional arrangement 100, see FIG. 1.

Referring again to FIGS. 1 and 2, the distance $P_2$ in the process direction P between the optical axis 230 of the first collimation lens 228 and the optical axis 280 of the second collimation lens 278 is equal to the distance $P_2$ in the process direction P between the optical axis 130 of the first collimation lens 128 and the optical axis 180 of the second collimation lens 178 of the conventional arrangement 100, see FIG. 1. The distance $P_2$ in the process direction P between the optical axis 230 of the first collimation lens 228 and the optical axis 280 of the second collimation lens 278 is also equal to the distance $P_2$ between the center point of the second aperture 266 and the center point of the first aperture 218. The distance $P_2$ in the process direction P between the optical axis 230 of the first lens 228 and the optical axis 280 of the second lens 278 is less than the distance $P_3$ between the first beam center axis 214 and the second beam center axis 262. As a result, the beam center axis 214 of the first laser beam 212 does not pass through the optical axis 230 of the first collimation lens 228 but rather strikes the first surface 226 of the first collimation lens 228 a spaced distance of about 100 microns to about 400 microns in the process direction P from the optical axis 230 of the first collimation lens 228 and in a direction toward a first end surface 228A of the first lens 228. This causes the first laser beam 212 to bend inward a first amount as previously mentioned. In the illustrated first embodiment assembly 200, the first laser beam 212 is bent inward, i.e., in a direction toward a center point 242A of the pre-scan lens 242, an amount within a range of about 0.25 degree to about 1 degree by the first collimation lens 228. The bending of the first laser beam 212 a first amount by the first collimation lens 228 and the subsequent bending of the first laser beam 212 a second amount by the pre-scan lens 242 results in the first beam 212 striking the scanner mirror 256 in the process direction at the point 252.

The beam center axis 262 of the second laser beam 260 does not pass through the optical axis 280 of the second collimation lens 278 but rather strikes the first surface 276 of the second collimation lens 278 a spaced distance of about 100 microns to about 400 microns in the process direction P from the optical axis 280 of the second collimation lens 278 and in a direction toward a first end surface 278A of the second lens 278. This causes the second laser beam 260 to bend inward a first amount as previously mentioned. In the illustrated first embodiment assembly 200, the second laser beam 260 is bent inward, i.e., in a direction toward the center point 242A of the pre-scan lens 242, an amount within a range of about 0.25 degree to about 1 degree by the second collimation lens 228. The bending of the second laser beam 260 a first amount by the second collimation lens 278 and the subsequent bending of the second laser beam 260 a second amount by the pre-scan lens 242 results in the second beam 260 striking the scanner mirror 256 in the process direction at the point 252.

Figure 3:
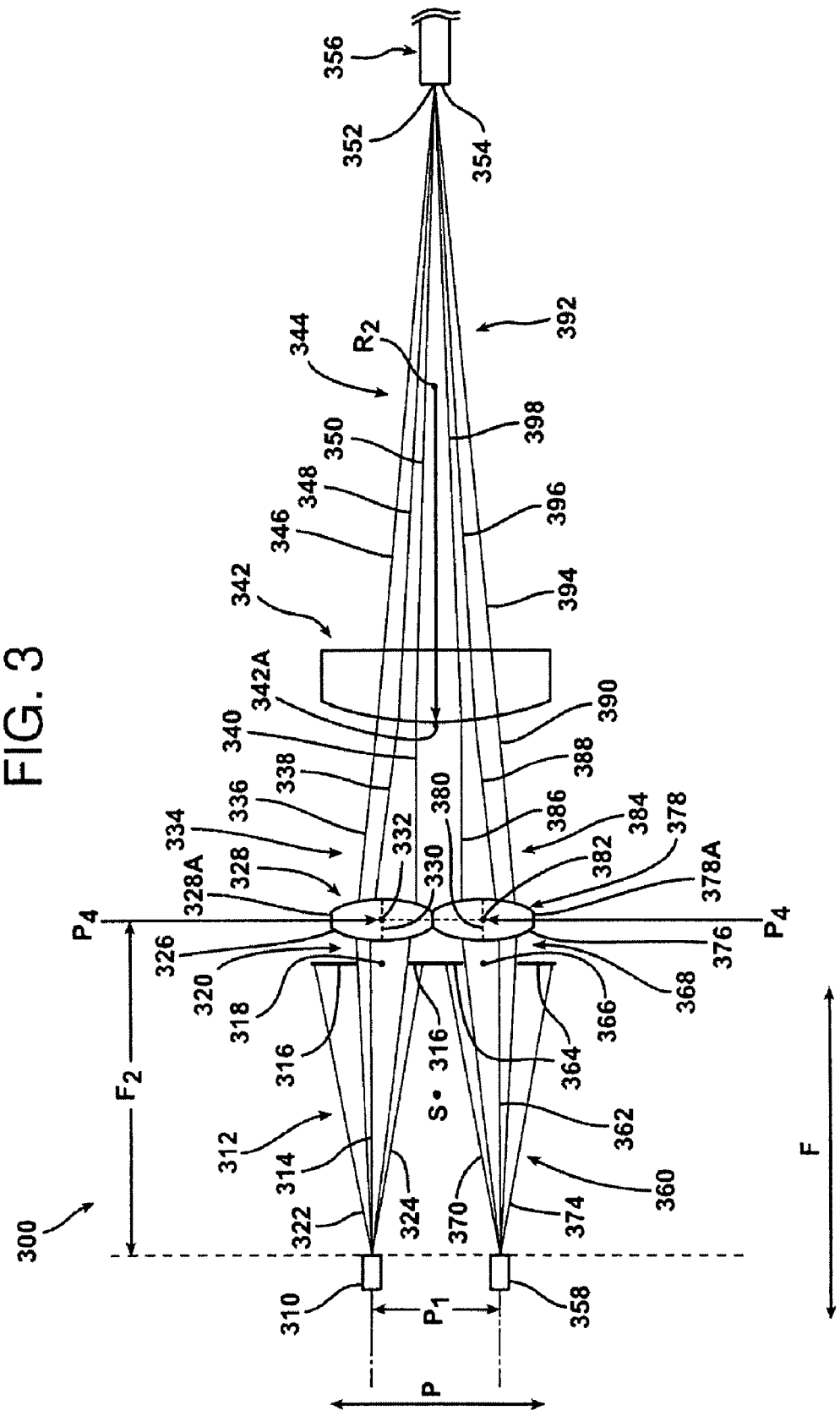
FIG. 3 is a diagrammatic representation of a laser diode/pre-scan assembly of a second embodiment of the present invention illustrating collimation lenses de-centered from the laser beam center axes by repositioning the collimation lenses and showing converging laser beams entering the pre-scan lens.

Referring now to FIG. 3, a laser diode/pre-scan assembly for use in a laser printer in accordance with a second embodiment of the present invention is shown diagrammatically, referred to generally by reference numeral 300. The illustrated laser diode/pre-scan assembly 300, hereinafter, second embodiment assembly, includes a first laser diode 310 emitting a first laser beam 312, having a first beam center axis 314. The first laser beam 312 diverges in both the process direction P and in the scan direction S upon leaving the first laser diode 310. In FIG. 3, the scan direction S is a direction in and out of the plane of the paper and is indicated by a point S.

In the second embodiment assembly 300, the first laser beam 312 diverges in the process direction P at an angle of about 8 degrees and in the scan direction S at an angle within a range of about 25 degrees to about 35 degrees. A first structure 316, defining a first aperture 318, is positioned in the path of the first laser beam 312 such that an inner portion 320 of the first laser beam 312 passes through the first aperture 318 and a peripheral portion of the first laser beam 312, represented by rays 322 and 324, is blocked by the first structure 316. The first aperture 318 in the second embodiment assembly is generally oval in shape and has a maximum dimension in the process direction P within a range of about 2 mm to about 3 mm and a larger maximum dimension in the scan direction S within a range of about 4 mm to about 5 mm.

After passing through the first aperture 318, the inner portion 320 of the first laser beam 312 strikes a first surface 326 of a first collimation lens 328. In the illustrated assembly 300, the first structure 316, defining the first aperture 318, is positioned about 1 mm in a focus direction F from the first surface 326 of the first collimation lens 328.

The first collimation lens 328 is a double convex spherical glass collimation lens having optical power in the process direction P and in the scan direction S. The first collimation lens 328 further has an optical axis 330 passing through a mechanical center 332 of the first collimation lens 328. In the second embodiment assembly 300 illustrated, the first beam center axis 314 is not coaxial with the optical axis 330 of the first collimation lens 328 as will be discussed more thoroughly herein.

The first collimation lens 328 has a focal length in the focus direction F defined as a distance between the mechanical center 332 of the lens 328 and a point (not shown) where light rays that are parallel with the lens 328 optical axis 330 will converge to a point after passing through the lens 328. In the second embodiment assembly 300 illustrated in FIG. 3, the first collimation lens 328 is positioned relative to the first laser diode 310 in the focus direction F such that a distance $F_2$ between the point where the first laser beam 312 is emitted from the first laser diode 310 and the mechanical center 332 of the first collimation lens 328 is greater than the focal length of the first collimation lens 328. As a result, the rays of the generally diverging first laser beam 314 passing through the first collimation lens 328 are caused to converge a first amount in the process direction P and a first amount in the scan direction S, wherein the first amount in the process direction P may be slightly different from the first amount in the scan direction S. Thus, the beam 334 emerging from the first collimation lens 338 is converging in the process direction P and in the scan direction S.

The distance $F_2$ is greater than the distance $F_1$, see FIG. 1, between the point where the first laser beam 112 is emitted from the first laser diode 110 and the mechanical center 130 of the first collimation lens 128 in the conventional arrangement 100, see FIG. 1.

Referring again to FIG. 3, in addition to being focused or converged in the process and scan directions by the lens 328, the first laser beam 312 upon passing through the first collimation lens 328 is also caused to deflect inward a first amount in the process direction P toward a pre-scan lens 342 as will be discussed more thoroughly herein.

The pre-scan lens 342 is a cylindrical lens having optical power in the process direction P only. The pre-scan lens 342 causes the rays 336, 338 and 340 of the converging first laser beam 334 to bend inward in the process direction P a second amount and further causes the rays 336, 338 and 340 to converge in the process direction P a second amount such that a converging first laser beam 344 comprising rays 346, 348 and 350 is created.

The pre scan lens 342 has a radius $R_2$ defining a focal length in the focus direction F such that the converging first laser beam 344 is directed to a point 352 in the process direction on a surface 354 of a scanner mirror 356, shown only partially in FIG. 3. The pre-scan lens 342 also causes the rays 346, 348 and 350 to converge in the process direction P a second amount such that the rays 346, 348 and 350 will converge or nearly converge in the process direction to the same point 352 on the surface 354 of the scanner mirror 356.

Referring now to FIGS. 1 and 3, the radius $R_2$ of the pre-scan lens 342 is greater than the radius $R_1$ of the pre-scan lens 142 in the conventional arrangement 100. As a result, the pre-scan lens 242 of the second embodiment assembly 300 has less power in the process direction P than does the pre-scan lens 142 of the conventional arrangement 100. Thus, the pre-scan lens 342 causes the first laser beam 334 to bend inward in the process direction P a second amount that is smaller than the amount that the pre-scan lens 142 of the conventional arrangement 100 causes the first laser beam 134 to bend inward in the process direction P.

The pre-scan lens 342 of the second embodiment assembly 300 also causes the first laser beam 334 to converge in the process direction P a second amount that is smaller than the amount that the pre-scan lens 142 of the conventional arrangement 100 causes the first laser beam 134 to converge in the process direction P. Because the first laser beam 334 is converging a first amount in the process direction after passing through the first collimation lens 328, the pre-scan lens 342 need further converge the first laser beam 334 a second amount in the process direction that is smaller than the amount that the pre-scan lens 142 of the conventional arrangement 100 converges the first laser beam 134 in the process direction in order for the beam to converge or nearly converge to the point 252 on the surface 354 of the scanner mirror 356 as desired.

The second embodiment assembly 300 also includes a second laser diode 358, emitting a second laser beam 360, having a second beam center axis 362. In the second embodiment assembly 300 illustrated, the second laser diode 358 is separated from the first laser diode 310 in the process direction P such that the second beam center axis 362 is separated from the first beam center axis 314 by a distance $P_1$ in the process direction P. The distance $P_1$ is equal to the distance $P_1$ that separates the first beam center axis 114 from the second beam center axis 162 in the conventional arrangement 100, see FIG. 1.

The second laser beam 360 diverges in both the process direction P and in the scan direction S upon leaving the second laser diode 358. The second laser beam 362 diverges in the process direction P at an angle of about 8 degrees and in the scan direction S at an angle within a range of about 25 degrees to about 35 degrees.

A second structure 364, defining a second aperture 366, is positioned in the path of the second laser beam 360 such that an inner portion 368 of the second laser beam 360 passes through the second aperture 366 and a peripheral portion of the second laser beam 360, represented by rays 370 and 374, is blocked by the second structure 364. The second aperture 368 is generally oval in shape and has a maximum dimension in the process direction P within a range of about 2 mm to about 3 mm and a larger maximum dimension in the scan direction S within a range of about 4 mm to about 5 mm. A center point of the second aperture 364 is spaced a distance $P_4$ from a center point of the first aperture.

After passing through the second aperture 366, the inner portion 368 of the second laser beam 360 strikes a first surface 376 of a second collimation lens 378. In the illustrated second embodiment assembly 300, the second structure 364, defining the second aperture 368, is positioned about 1 mm in the focus direction F from the first surface 376 of the second collimation lens 378.

The second collimation lens 378 is a double convex spherical glass collimation lens having optical power in the process direction P and in the scan direction S. The second collimation lens 378 further has an optical axis 380 passing through a mechanical center 382 of the second collimation lens 378. In the second embodiment assembly 300 illustrated, the second beam center axis 362 is not coaxial with the optical axis 380 of the second collimation lens 378 as will be discussed more thoroughly herein.

The second collimation lens 378 has a focal length in the focus direction F defined as a distance between the mechanical center 382 of the lens 378 and a point (not shown) where light rays that are parallel with the lens 378 optical axis 380 will converge to a point after passing through the lens 378. In the second embodiment assembly 300 illustrated in FIG. 3, the second collimation lens 378 is positioned relative to the second laser diode 358 in the focus direction F such that a distance $F_2$ between the point where the second laser beam 360 is emitted from the second laser diode 358 and the mechanical center 382 of the second collimation lens 378 is greater than the focal length of the second collimation lens 378. As a result, the rays of the generally diverging second laser beam 360 passing through the second collimation lens 378 are caused to converge a first amount in the process direction P and a first amount in the scan direction S, wherein the first amount in the process direction P may be slightly different from the first amount in the scan direction S. Thus, the beam 384 emerging from the second collimation lens 378 is converging in the process direction P and in the scan direction S.

The distance $F_2$ is greater than the distance $F_1$, see FIG. 1, between the point where the second laser beam 160 is emitted from the second laser diode 158 and the mechanical center 182 of the second collimation lens 178 in the conventional arrangement 100, see FIG. 1.

Referring again to FIG. 3, in addition to being focused or converged in the process and scan directions by the lens 378, the second laser beam 360 upon passing through the second collimation lens 378 is also caused to deflect inward a first amount in the process direction P toward the pre-scan lens 342 as will be discussed more thoroughly herein.

As previously mentioned, the pre-scan lens 342 is a cylindrical lens having optical power in the process direction P only. The pre-scan lens 342 causes the rays 386, 388 and 390 of the converging second laser beam 384 to bend inward in the process direction P a second amount and further causes the rays 386, 388 and 390 to converge in the process direction P a second amount such that a converging second laser beam 392 comprising rays 394, 396 and 398 is created.

As noted above, the pre scan lens 342 has a radius $R_2$ defining a focal length in the focus direction F such that the converging second laser beam 392 is directed to a point in the process direction that is near or the same point 352 on the surface 354 of the scanner mirror 356 where the converging first laser beam 344 strikes the surface 354 of the scanner mirror 356. In the second embodiment assembly 300 illustrated in FIG. 3, the converging second laser beam 392 strikes the surface 354 of the scanner mirror 356 at a point that is within a range of from about 0 microns to about 200 microns of the point 352 where the converging first laser beam 344 strikes the surface 354 of the scanner mirror 356. The pre-scan lens 342 also causes the rays 394 396 and 398 to converge in the process direction P a second amount such that the rays 394, 396 and 398 will converge or nearly converge in the process direction to the same point 352 on the surface 354 of the scanner mirror 356.

Referring now to FIGS. 1 and 3, as noted above, the radius $R_2$ of the pre-scan lens 342 is greater than the radius $R_1$ of the pre-scan lens 142 in the conventional arrangement 100. As a result, the pre-scan lens 342 of the second embodiment assembly 300 has less power in the process direction P than does the pre-scan lens 142 of the conventional arrangement 100. Thus, the pre-scan lens 342 causes the second laser beam 384 to bend inward in the process direction P a second amount that is smaller than the amount that the pre-scan lens 142 of the conventional arrangement 100 causes the second laser beam 184 to bend inward in the process direction P.

The pre-scan lens 342 of the second embodiment assembly 300 also causes the second laser beam 384 to converge in the process direction P a second amount that is smaller than the amount that the pre-scan lens 142 of the conventional arrangement 100 causes the second laser beam 184 to converge in the process direction P. Because the second laser beam 384 is converging a first amount in the process direction after passing through the second collimation lens 378, the pre-scan lens 342 need further converge the second laser beam 384 a second amount in the process direction that is smaller than the amount that the pre-scan lens 142 of the conventional arrangement 100 converges the second laser beam 184 in order for the beam to converge or nearly converge in the process direction to the point 252 on the surface 354 of the scanner mirror 356 as desired.

In the illustrated second embodiment assembly 300, the distance $P_4$ in the process direction P between the first collimation lens mechanical center 332 and the second collimation lens mechanical center 382 is less than the distance $P_2$ in the process direction P between the first collimation lens mechanical center 130 and the second collimation lens mechanical center 182 of the conventional arrangement 100, see FIG. 1. The distance $P_4$ in the process direction P is also less than the distance $P_1$ between the first beam center axis 314 and the second beam center axis 362. This may be accomplished by spacing the first collimation lens 328 and the second collimation lens 378 closer to one another an equal amount in the process direction P relative to the positions of the first collimation lens 128 and the second collimation lens 178 in the conventional arrangement 100, see FIG. 1.

Referring again to FIGS. 1 and 3, the distance $P_1$ in the process direction P between the first beam center axis 314 and the second beam center axis 362 is equal to the distance $P_1$ in the process direction P between the first beam center axis 114 and the second beam center axis 162 of the conventional arrangement 100, see FIG. 1. As a result, the beam center axis 314 of the first laser beam 312 does not pass through the optical axis 330 of the first collimation lens 328 but rather strikes the first surface 326 of the first collimation lens 328 a spaced distance of about 100 microns to about 400 microns in the process direction P from the optical axis 330 of the first collimation lens 328 and in a direction toward a first end surface 328A of the first lens 328. This causes the first laser beam 312 to bend inward in a direction toward the pre-scan lens 342 a first amount as previously mentioned. In the illustrated second embodiment assembly 300, the first laser beam 312 is bent inward toward the pre-scan lens 342 an amount within a range of about 0.25 degree to about 1 degree by the first collimation lens 328.

The beam center axis 362 of the second laser beam 360 does not pass through the optical axis 380 of the second collimation lens 378 but rather strikes the first surface 376 of the second collimation lens 378 a spaced distance of about 100 microns to about 400 microns in the process direction P from the optical axis 380 of the second collimation lens 378 and in a direction toward a first end surface 378A of the second lens 378. This causes the second laser beam 360 to bend inward toward the pre-scan lens 342 a first amount as previously mentioned. In the illustrated second embodiment assembly 300, the second laser beam 360 is bent inward toward the pre-scan lens 342 an amount within a range of about 0.25 degree to about 1 degree by the second collimation lens 228.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laser pre-scan assembly, comprising:
   a first laser diode for emitting a first laser beam having a first beam center axis and a second laser diode for emitting a second laser beam having a second beam center axis, said first beam center axis and said second beam center axis being separated from one another by a first distance in a process direction;
   a first collimation assembly comprising a first collimation lens having a first optical axis and causing said first laser beam to converge in a scan direction and in the process direction;
   a second collimation assembly comprising a second collimation lens having a second optical axis and causing said second laser beam to converge in the scan direction and in the process direction, said first optical axis being separated from said second optical axis by a second distance in the process direction; and
   a pre-scan lens configured to further converge said first laser beam and said second laser beam in the process direction and direct said first and second laser beams onto or near a common point on a surface of a scanner mirror, wherein said first collimation lens and said second collimation lens are positioned relative to said first laser diode and said second laser diode such that said first distance is greater than said second distance so that said first collimation lens directs said first laser beam inwardly in the process direction toward said pre-scan lens and said second collimation lens directs said second laser beam inwardly in the process direction toward said pre-scan lens;
   wherein a distance in a focus direction between said first laser diode and said first collimation lens is greater than a distance defined by a focal length of said first collimation lens and a distance in the focus direction between said second laser diode and said second collimation lens is greater than a distance defined by a focal length of said second collimation lens.

2. The laser pre-scan assembly as set out in claim 1, wherein said first collimation lens directs said first laser beam inwardly in the process direction toward said pre-scan lens an amount within a range of from about 0.25 degree to about 1 degree and said second collimation lens directs said second laser beam inwardly in the process direction toward said pre-scan lens an amount within a range of from about 0.25 degree to about 1 degree.

3. The laser pre-scan assembly as set out in claim 1, wherein said first collimation assembly further comprises a first structure defining a first aperture for receiving said first laser beam, said first structure being configured to block a portion of said first laser beam passing therethrough; and said second collimation assembly further comprises a second structure defining a second aperture for receiving said second laser beam, said second structure being configured to block a portion of said second laser beam passing therethrough.

4. The laser pre-scan assembly as set out in claim 3, wherein said first structure defining said first aperture has a first dimension in the scan direction and a second smaller dimension in the process direction and said second structure defining said second aperture has a first dimension in the scan direction and a second smaller dimension in the process direction.

5. The laser pre-scan assembly as set out in claim 1, wherein said first laser beam converges or nearly converges to a first point on the surface of the scanner mirror and said second laser beam converges or nearly converges to a second point on the surface of the scanner mirror, and said first point is near or the same point as said second point.

6. The laser pre-scan assembly as set out in claim 5, wherein a distance between where said first laser beam and said second laser beam strike the surface of the scanner mirror is within a range of from about 0 microns to about 200 microns.

7. The laser pre-scan assembly as set out in claim 1, wherein said first collimation lens comprises a double convex spherical lens and said second collimation lens comprises a double convex spherical lens.

8. The laser pre-scan assembly as set out in claim 1, wherein said pre-scan lens comprises a cylindrical lens, having power in the process direction.

9. A laser pre-scan assembly comprising:
a laser diode for emitting a laser beam; and
a collimation assembly comprising a collimation lens having an optical axis, said collimation lens being positioned relative to said laser diode such that said laser beam enters said collimation lens a spaced distance away from said optical axis so that said collimation lens directs said laser beam inwardly in a process direction;
wherein a distance in a focus direction between said laser diode and said collimation lens is greater than a distance defined by a focal length of said collimation lens.

10. The laser pre-scan assembly as set out in claim 9, wherein said spaced distance is from about 100 microns to about 400 microns.

11. The laser pre-scan assembly as set out in claim 9, wherein said collimation lens is positioned relative to said laser diode such that said collimation lens converges said laser beam in a scan direction and in the process direction.

12. The laser pre-scan assembly as set out in claim 11, further comprising a pre-scan lens configured to further converge said laser beam in the process direction and direct said laser beam onto a point on a surface of a scanner mirror.

13. The laser pre-scan assembly as set out in claim 9, wherein said collimation assembly further comprises a structure defining an aperture for receiving said laser beam, said structure being configured to block a portion of said laser beam passing therethrough.

14. The laser pre-scan assembly as set out in claim 13, wherein said structure defining said aperture has a first dimension in the scan direction and a second smaller dimension in the process direction.

15. The laser pre-scan assembly as set out in claim 9, wherein said laser beam converges or nearly converges to a point in the process direction on the surface of the scanner mirror.

16. A method of constructing a laser pre-scan assembly comprising:
providing a first laser diode for emitting a first laser beam having a first beam center axis and a second laser diode for emitting a second laser beam having a second beam center axis, said first beam center axis and said second beam center axis being separated from one another by a first distance in a process direction;
providing a first collimation assembly comprising a first collimation lens having a first optical axis and causing said first laser beam to converge in a scan direction and in the process direction;
providing a second collimation assembly comprising a second collimation lens having a second optical axis and causing said second laser beam to converge in the scan direction and in the process direction, said first optical axis being separated from said second optical axis by a second distance in the process direction; and
providing a pre-scan lens configured to further converge said first laser beam and said second laser beam in the process direction and direct said first and second laser beams onto or near a common point on a surface of a scanner mirror,
wherein a distance in a focus direction between said first laser diode and said first collimation lens is greater than a distance defined by a focal length of said first collimation lens and a distance in the focus direction between said second laser diode and said second collimation lens is greater than a distance defined by a focal length of said second collimation lens.

17. The method as set out in claim 16, wherein said first collimation lens and said second collimation lens are positioned relative to said first laser diode and said second laser diode such that said first distance is greater than said second distance so that said first collimation lens directs said first laser beam inwardly in the process direction toward said pre-scan lens and said second collimation lens directs said second laser beam inwardly in the process direction toward said pre-scan lens and said first collimation lens directs said first laser beam inwardly in the process direction toward said pre-scan lens an amount within a range of from about 0.25 degree to about 1 degree and said second collimation lens directs said second laser beam inwardly in the process direction toward said pre-scan lens an amount within a range of from about 0.25 degree to about 1 degree.

18. The method as set out in claim 16, wherein said providing a first collimation assembly further comprises providing a first structure defining an aperture for receiving said first laser beam, said first structure being configured to block a portion of said first laser beam passing therethrough; and providing a second collimation assembly further comprises providing a second structure defining an aperture for receiving said second laser beam, said second structure being configured to block a portion of said second laser beam passing therethrough.

* * * * *